US008250426B2

(12) United States Patent  
Larsson

(10) Patent No.: US 8,250,426 B2  
(45) Date of Patent: Aug. 21, 2012

(54) RELIABLE MULTICAST WITH LINEARLY INDEPENDENT DATA PACKET CODING

(75) Inventor: Peter Larsson, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 465 days.

(21) Appl. No.: 12/515,924

(22) PCT Filed: Nov. 29, 2006

(86) PCT No.: PCT/SE2006/001368
§ 371 (c)(1),
(2), (4) Date: Feb. 3, 2010

(87) PCT Pub. No.: WO2008/066421
PCT Pub. Date: Jun. 5, 2008

(65) Prior Publication Data
US 2010/0146357 A1      Jun. 10, 2010

(51) Int. Cl.
*H04L 1/18* (2006.01)
(52) U.S. Cl. .................. 714/749; 714/748; 714/751
(58) Field of Classification Search .................. 714/748, 714/749
See application file for complete search history.

(56) References Cited

U.S. PATENT DOCUMENTS

2004/0223507 A1* 11/2004 Kuchibhotla et al. ......... 370/428
2007/0011555 A1*  1/2007 Kim et al. ..................... 714/749

OTHER PUBLICATIONS

International Search Report for PCT/SE2006/001368, mailed Oct. 18, 2007.
Yong, S et al., "XOR Retransmission in Multicast Error Recovery", IEEE International Conference on Networks, (Sep. 5-9, 2004), pp. 336-440.
Gkantsidis, C et al., "Network Coding for Large Scale Content Distribution", IEEE Computer and Communications Societies, (Mar. 13-17, 2005), pp. 2235-2245.
Larsson, P. et al., "Multi-User ARQ", Vehicular Technolollgy Conference, (Sep. 18, 2006), pp. 2052-2057.

* cited by examiner

*Primary Examiner* — Sam Rizk
(74) *Attorney, Agent, or Firm* — Nixon & Vanderhye P.C.

(57) ABSTRACT

Regular data packets are scheduled for transmission from a sender to multiple receivers in a multicast ARQ system. In a joint scheduling and encoding procedure, a composite data packet is formed as a weighted linear combination of regular data packets. The corresponding coding weights are adapted based on feedback information from the receivers about received data packets such the composite packet represents a new linearly independent coding of regular data packets different from any multicast data packet previously received each receiver in a selected set of the receivers during the multicast session. In addition, using a weight vector with at least two different non-zero coding weights adds a further degree of freedom and guarantees the ability to always form a composite data packet that represents a new linearly independent coding for transmission. The ability to transmit linearly independent data packets in at least a majority of the transmission instances will significantly improve the throughput performance for reliable multicasting, especially when the number of users is large.

29 Claims, 7 Drawing Sheets

Feedback (ACKs)

RELIABLE MULTICAST WITH LINEARLY INDEPENDENT DATA PACKET CODING

This application is the U.S. national phase of International Application No. PCT/SE2006/001368, filed 29 Nov. 2006, which designated the U.S., the entire contents of which are hereby incorporated by reference.

TECHNICAL FIELD

The present invention generally relates to multicast communication systems, and more particularly to a novel strategy for scheduling and encoding packets for multicast transmission.

BACKGROUND

There is a continuously growing demand for improved performance in communication systems in general and in wireless networks in particular. Multicasting is an approach for improving the throughput by efficiently transmitting the same information to multiple users/receivers. When the channel is unreliable, it may not be possible to deliver the data to all receivers in a reliable way. Therefore multicasting over unreliable channels typically requires the use of Forward Error Correction (FEC) techniques or backward error correction techniques such as Automatic Repeat reQuest (ARQ).

So-called Fountain coding is an interesting approach for reliable multicast [1-2]. Fountain coding is an ideal rate-less data encoding scheme, a form of FEC, which produces new parity information until all users have decoded the sent data file. Approximation of ideal fountain codes are so called Tornado codes and LT-codes. Other Fountain codes include so called Tornado codes and Online codes. The basic philosophy, in LT codes (and generally in most Fountain codes) in which new parity information is formed, is based on randomly selecting the coding degree, i.e. the number of packets to be coded together, according to a predefined degree distribution and then bitwise XORing (modulo 2 adding) the packets. While not inherently a part of the Fountain coding, an acknowledgement is typically sent when the receiver have received sufficient number of parity packets that enable decoding, and not earlier than that. Hence, only one acknowledgement is needed for a FC file per user. Those approximations of FC enable efficient multicasting in erasure channels where roughly an amount $\epsilon$ more redundancy than data needs to be received.

ARQ is an efficient error control strategy for data transmission where the receiver detects transmission errors in the messages and automatically requests retransmission from the sender. Usually feedback messages from the receivers to the sender are used to enable the sender to determine which packets have been received correctly by the intended receivers and which ones have not. The packets that have not been received correctly must be resent.

ARQ is proposed to be used as a standard for communication over the air interface in cellular wireless communication systems, and can also be used in multihop systems. Typically, the information is divided into smaller packets, called protocol data units (PDU), prior to the transmission. A reliable transfer is enabled by encoding packets with an error detecting code, such that the receiver can detect erroneous or lost packets and thereby request retransmission. The data sequence integrity is normally ensured by sequential numbering of packets and applying certain transmission rules.

It may be useful to first review the basic principles for ARQ based on unicast before discussing details on multicast ARQ, keeping in mind that the basic principles from unicast ARQ mostly carry over to multicast ARQ.

In the most simple form of ARQ, commonly referred to as Stop-and-Wait ARQ, the sender of data stores each sent data packet and waits for an acknowledgement from the receiver of a correctly received data packet, by the way of an acknowledgement message (ACK). When the ACK is received, the sender discards the stored packet and sends the next packet. The process is typically supplemented with timers and the use of negative acknowledgement messages (NACK). The sending entity uses a timer, which is started on the transmission of a data packet, and if no ACK (or NACK) has been received before the timer expires, the data packet is retransmitted. If the receiver detects errors in the packet, it can send a NACK to sender. Upon receiving the NACK, the sender retransmits the data packet without waiting for the timer to expire. If the ACK or NACK message is lost, the timer will eventually expire and the sender will retransmit the data packet.

From the simple Stop-and-Wait, more elaborated schemes of the conventional ARQ has been developed, for example Go-Back-N and Selective Reject (or Selective Repeat), which provides a higher throughput.

In another line of development of the ARQ, the redundancy in the coding is exploited in various ways to enhance communication performance (generally measured as throughput). These schemes are referred to as Hybrid ARQ schemes. A combination of coding and ARQ, the hybrid ARQ schemes, can give a certain adaptation to changes in the radio environment, e.g. to fading. In Hybrid 1 ARQ, FEC is combined with ARQ. In Hybrid 2 ARQ, a PDU is sent more or less FEC encoded, but accompanied with a Cyclic Redundancy Check (CRC) for checking presence of bit errors after decoding and if retransmission is requested, parity bits (also known as redundancy bits) generated by a FEC coder, systematic bits, or a combination of both is sent.

If efficiency is not the main target, multiple parallel unicast ARQ processes may be used to ensure reliable "multicast". This may be a common approach when the size of the multicast group, i.e. the number of intended receivers, is small. For larger groups, this is however an inefficient way of communication. It is therefore typically considered more efficient to merge the parallel unicast processes into a single so-called multicast ARQ process, where the same information is transmitted to multiple users [3].

Reference [4] relates to optimization of the performance for reliable multiple unicast flows.

References [5-7] describe schemes where the same data is multicasted to multiple users, and efficient retransmission is enabled by combining several packets negatively acknowledged (NACKed) by different receivers into a single block.

A problem with traditional multicast ARQ in general is that the performance is extremely poor when the number of users is large. In fact, it is noted as well as easily realized that the throughput efficiency goes towards zero when the number of users K goes towards infinity.

While fountain coding alleviates the performance problems in traditional multicast ARQ, its performance is roughly $T = p/(1+\epsilon)$, where T is the throughput efficiency, $\epsilon$ depends on the amount of data being sent and p is the reception probability. In [2], it was roughly stated that $1+\epsilon$ is more than 1.06 with probability $1/10$ and was not more than 1.10 in 10 000 trials of a so-called Tornado Z code implementation. Moreover it is stated that Tornado codes do not have tight enough bounds on the decoding inefficiency for commercial applications, and that for current commercial Digital Fountain implementations of LT codes, the decoding inefficiency is more than 1.05 with probability less than 10 for almost any size source file.

There are several drawbacks with Fountain coding. FC relies on statistically ensuring decodability by over provisioning of redundancy information, and does not rely on deterministic decodability. First, one typically requires large amounts of information for a small value of $\epsilon$ and the performance is typically poor when only a small amount of data packets is communicated. The time to decode the delivered data is fairly long as all redundancy needs to be received before decodability can be guaranteed. LT codes, a form of Fountain codes, are also known to have a bad error floor behavior that at least in part have been addressed by other FC like Tornado codes.

Although the schemes proposed in references [5-7] represent a step in the right direction for multicast ARQ with deterministic decodability, these schemes do still not provide optimum performance. A reason for this is that traditional multicast ARQ operation is more static than needed and does not recognize and exploit all degrees of freedom.

There is thus a general need for an even more throughput-efficient strategy for reliable multicasting.

SUMMARY

The present invention overcomes these and other drawbacks of the prior art arrangements.

It is a general object of the present invention to provide a highly throughput-efficient strategy for reliable multicasting.

It is an object of the invention to provide a method and arrangement for scheduling and encoding data packets for transmission in a multicast session from a sender to at least two receivers in a multicast ARQ system.

It is also an object to provide a sender adapted for use in a multicast ARQ system.

It is a specific object to provide a multicast strategy that enables enhanced throughput, reduced delay and/or reduced energy consumption.

It is particularly desirable to provide a multicast strategy that enables deterministic decodability of encoded packets.

These and other objects are met by the invention as defined by the accompanying patent claims.

The invention generally relates to scheduling and encoding of data packets for transmission in a multicast session from a sender to a multicast group of at least two receivers in a multicast ARQ system.

A basic idea of the invention is to perform a procedure, at each of a plurality of scheduling instances, including forming at least one composite data packet as a weighted linear combination of regular data packets based on a corresponding weight vector comprising a set of coding weights by using feedback information from the receivers indicating received data packets, and transmitting the formed composite data packet(s) to the receivers of the considered multicast group. In this procedure, the coding weights of the weight vector are adapted, for each of the composite data packet or packets, based on the feedback information such that the composite packet represents a linear combination that is linearly independent, for each receiver of at least a set of the receivers, of any data packet previously received by the receiver during the considered multicast session.

By performing this procedure in connection with each of a plurality of scheduling instances, the number of transmissions required for transfer of a given amount of multicast information will be reduced.

The ability to transmit new linearly independent data packets (composite data packets and optionally regular packets as well) in at least a majority of the transmission instances during a multicast session will significantly improve the throughput performance for reliable multicasting, especially when the number of users is large.

In an ideal situation, when systematically transmitting a number of regular and/or composite data packets that are linearly independent from any data packet (regular or composite) previously received by each of the receivers comprised in a set of receivers during a multicast session it will be sufficient to send merely N such data packets to retrieve all N regular data packets, thus obtaining maximum throughput.

In any case, compared to conventional multicast ARQ, the invention requires fewer data packets to be sent from the sender to the receivers to ensure correct reception of transmitted data packets.

The invention thus enables improved throughput efficiency for (fully) reliable multicast, and also provides a deterministically decodable re-transmission scheme.

In, for instance, Fountain Coding, the number of sub-packets that need to be received in order for decoding the full file is a random variable, i.e. not deterministically bounded.

The invention provides a system implementing the above scheme as well as a corresponding sender adapted for use in a multicast ARQ system.

The present invention is generally applicable to multicast ARQ in communication systems having unreliable links, such as wireless communication systems. For example, the invention may advantageously be utilized in a typical cellular system with a base station in communication with a plurality of mobile terminals.

The invention may offer the following advantages:
Reliable multicasting.
Increased (or even the maximum) throughput.
Reduced (or even the minimum) latency.
Improved energy/power utilization.
Deterministic bounds on the number of packets that need to be received for decodability.

Other advantages offered by the invention will be appreciated when reading the below description of embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION

Figure 1:
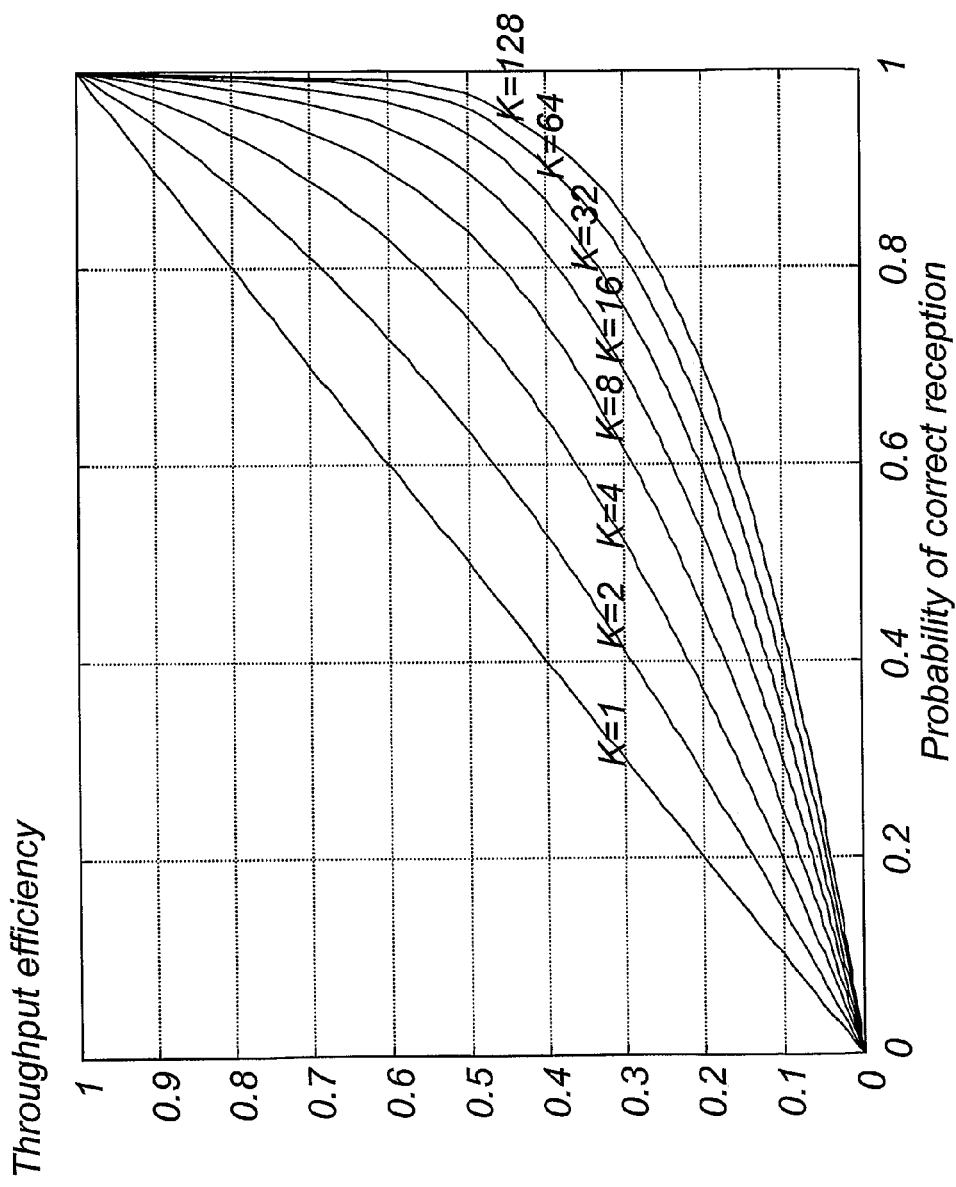
FIG. 1 illustrates the throughput efficiency of fully reliable multicast ARQ for K=1, 2, 4, 8, 16, 32, 64 and 128, as a function of the probability of correct reception.

Throughout the drawings, the same reference characters will be used for corresponding or similar elements.

In the following, the term "regular data packet" denotes an ordinary (non-composite) data packet (i.e. just a plain ordinary data packet), whereas a composite data packet is based on at least two regular data packets. A "multicast data packet" can be a regular data packet or a composite data packet, and in its most generic meaning such a data packet may be referred to as a "general data packet", "multicast data packet" or "general multicast data packet".

A problem with traditional multicast ARQ in general is that the performance is extremely poor when the number K of receivers/users is large. FIG. 1 illustrates the throughput efficiency of fully reliable multicast ARQ for K=1, 2, 4, 8, 16, 32, 64 and 128, as a function of the probability of correct reception. The leftmost curve illustrates the situation for K=1. As can be seen, the performance is reduced as the number K of nodes increases, and approaches zero when the number of nodes approaches infinity, except in the special ideal case when the probability of correct reception equals 1.

There is thus a general need for a more throughput-efficient strategy for reliable multicasting.

Figure 2:
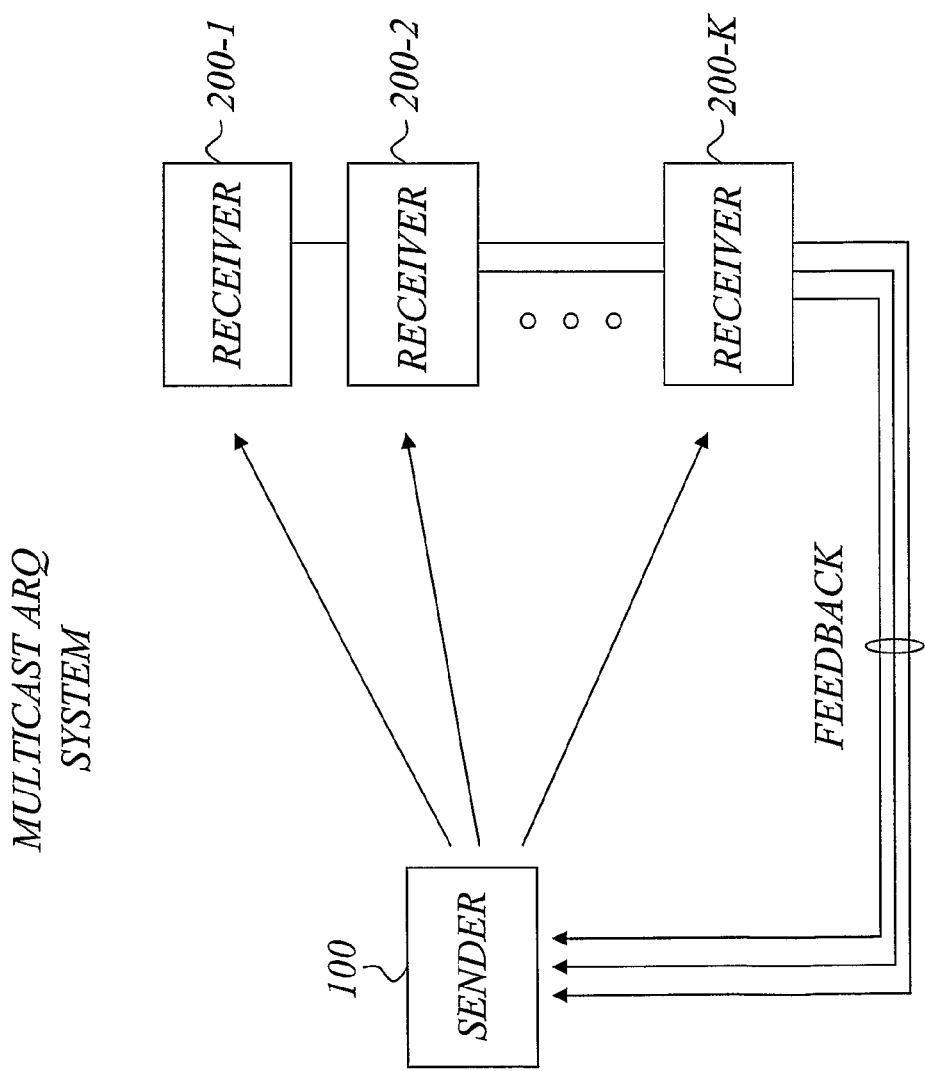
FIG. 2 is a schematic block diagram illustrating a simple example of a multicast ARQ system overview.

It will be useful to begin with a brief overview of a multicast ARQ system. In the ARQ communication system to be used with the present invention, a sender 100 is generally engaged in a multicast communication session with multiple receivers 200, as schematically illustrated in FIG. 2. The sender 100 is normally represented by a sending node, such as a base station in transmitting operation, and the receivers 200-1 to 200-K are normally represented by receiving nodes, for example realized by mobile terminals in receiving operation. It should be noted that a mobile terminal for example could also act as a sending node, and a base station as a receiving node. In multicast communication, the same set of information is normally sent to all receivers part of a multicast group. The multicast group generally includes at least two receivers, sometimes referred to as users. For transmission of a number of data packets in a multicast session, this generally means that each individual data packet is a so-called multicast data packet intended for all the considered receivers. It should be noted that if communication is intended to all users within e.g. a cell or a system, this is often denoted broadcast rather than multicast. Hence, broadcasting is just the extreme case of multicasting where all receivers in a cell or similar receive the data.

The present invention may advantageously be utilized in typical cellular systems with a base station in communication with a plurality of mobile terminals. In general, various scheduling schemes may be utilized in such systems to enhance performance and ARQ is used to increase the reliability of the transmissions.

The invention will described in a wireless scenario but could equally well be used in other communication scenarios with unreliable links.

The basic idea of the present invention relies on performing a procedure at each of a plurality of scheduling instances including forming at least one composite data packet as a weighted linear combination of regular data packets based on a corresponding weight vector comprising a set of coding weights by using feedback information from the receivers indicating received data packets, and transmitting the formed composite data packet(s) to the receivers of the considered multicast group. In this procedure, the coding weights of the weight vector are preferably adaptively selected, for each of the composite data packet or packets, based on the feedback information such that the composite packet represents a linear combination of regular data packets linearly independent of any data packet (regular or composite) previously received by each of the receivers in a relevant set of the receivers of the multicast group during the multicast session.

The relevant set of receivers mentioned above generally includes at least two receivers, and may be a subset or the full set of receivers in the overall multicast group.

By "previously received data packet" is generally meant a multicast data packet (regular or composite) that have been correctly demodulated and FEC decoded at the receiver side.

By performing this procedure at each of a plurality (two or more) of scheduling instances and transmitting new linearly independent data packets (composite data packets and possibly regular data packets as well), the number of transmissions required for transfer of a given amount of multicast information will be reduced and the throughput performance for reliable multicasting will be improved.

As will be understood by the skilled person, the relevant set of receivers/users to be considered in the adaptation of coding weights will change as the multicast session progresses, and may differ from one scheduling instance to the next. As soon as a receiver has received all the multicast data packets, this receiver will not be considered anymore. In general, only receivers that still need to receive one or more multicast data packets are considered as the relevant set of the multicast group. This means that during the overall multicast session the relevant set of receivers considered in the scheduling process (i.e. the weight adaptation) will be gradually reduced until all receivers have received all the multicast information.

The inventor has realized the importance of adapting the code weights based on previously received set of packets for each receiver in a selected set of receivers, rather than as in prior art selecting a subset of receivers for which a static all-one code vector is applied provided all receivers have received all packets except one.

As will be explained in detail later on, the idea of linearly independent data packet coding can be described in terms of increasing the rank of a matrix of weight vectors (comprising coding weights). To be more specific, previously received multicast data packets (regular and/or composite data packets), for each receiver, can be described as a linear system of equations based on a matrix of weight vectors. The increase in rank corresponds to the formation of a new linearly independent row in the matrix of weight vectors, which is equivalent to a new linearly independent coding of a multicast data packet.

For a better understanding of the invention it may be helpful to consider an illustrative example. Consider a sender with two regular data packets to be transmitted to two receivers/users $U_1$ and $U_2$. Table I below illustrates an example of a possible transmission/retransmission scenario according to an exemplary embodiment of the invention. For example, the coding set "001" means that the first regular packet is multiplied with the coding weight 0, the second regular packet is multiplied with the coding weight 0 and the third regular packet is multiplied with the coding weight 1, effectively meaning that only the third regular packet is transmitted. In the same way "001" for a user means that this particular user has received the third regular data packet, whereas "x" for a user means that no information has been received correctly by that user.

TABLE I

| TX# | Set | $U_1$ | $U_2$ | Comments |
| --- | --- | --- | --- | --- |
| 1 | 001 | 001 | x | $U_1$ receives the third regular packet. |
| 2 | 010 | x | 010 | $U_2$ receives the second regular packet. |
| 3 | 100 | x | 100 | $U_2$ receives the first regular packet. |

TABLE I-continued

| TX# | Set | $U_1$ | $U_2$ | Comments |
|---|---|---|---|---|
| 4 | 111 | 111 | x | May e.g. not send 110 (as the rank for $U_2$ would not increase), but 111, 101 and 011 OK. $U_1$ receives composite packet based on weights 111. |
| 5 | 011 | 011 | x | $U_1$ receives composite packet based on weights 011. |
| 6 | 001 | — | 001 | $U_2$ receives composite packet based on weights 001. |

The example of Table I shows two users receiving three packets. It is noted that it is generally not sufficient to receive only regular packets first and a single composite packet to enable decoding of all regular data packets. Instead, it is illustrated that the sender needs to adaptively select code weights and in this particular example it is doing so in each step such that the rank of each user's receiver-specific matrix would increase for all relevant users if they would receive the composite packet. The adaptation of weights, as described here, instead of adapting the set of users to which a single composite packet is sent, as described in prior art documents [5-7], enhances the performance radically. In addition, references [5-7] do not employ user-specific matrices for scheduling and encoding. It is further noted that in references [5-7] the transmitter does not send packets in such a way that the receiver may use multiple composite packets concurrently for decoding.

In this example, it can also be noted that as one user have received a sufficient number of data packets, regular and composite data packets, and the rank of the corresponding matrix is full, it is no longer necessary, or even possible, to increase the rank of that receiver's matrix any further. Hence, only the non-full rank matrices are considered in determining the adaptive code weights that ensure that the rank increase for the remaining non-full rank matrix receivers. Assume that the coding weights of a composite data packet at a first scheduling instance are adapted such that the composite packet represents a linear combination that is linearly independent, for each receiver of a first set of the receivers, of any data packet previously received by the receiver during the multicast session. At a second later scheduling instance, the coding weights of another composite data packet may thus be adapted such that the composite packet represents a linear combination that is linearly independent, for each receiver of a second smaller set of the receivers, of any data packet previously received by the receiver during the multicast session.

Naturally, in a more realistic scenario the number of users and the number of data packets will often be greater, but the above simplified example serves to illustrate the key features of the present invention. In practical applications, the number of users/receivers K can be any number from two up to perhaps hundred or more.

Normally, a linear combination of for example two regular data packets such as a packet A and a packet B simply means that the packets are combined with equal weighting, effectively using the same coding weight "1". Those regular data packets (such as a packet C and a packet D) that are not considered in the linear combination can be regarded as having the coding weight "0".

Under certain circumstances, especially when the multicast group includes three or more users, the possibility to select a weight vector having at least two different non-zero coding weights will enhance (and under most circumstances guarantees) the ability to form a composite data packet that represents a new linearly independent coding of regular data packets different from any data packet (regular data packet or composite data packet) previously received by each relevant receiver, being part of the selected set of receivers, during the multicast session.

Consider a sender with two regular data packets to be transmitted to three receivers/users $U_1$, $U_2$ and $U_3$. Table II below illustrates an example of a possible transmission/retransmission scenario according to another exemplary embodiment of the invention. For example, the coding set "01" means that the first regular packet is multiplied with the coding weight 0 and the second regular packet is multiplied with the coding weight 1, effectively meaning that only the second regular packet is transmitted. In the same way "01" for a user means that this particular user has received the second regular data packet, whereas "x" for a user means that no information has been received correctly by that user.

TABLE II

| TX# | Set | $U_1$ | $U_2$ | $U_3$ | Comments |
|---|---|---|---|---|---|
| 1 | 01 | 01 | x | x | $U_1$ receives the second regular packet. |
| 2 | 10 | x | 10 | x | $U_2$ receives the first regular packet. |
| 3 | 11 | x | x | 11 | $U_3$ receives a composite packet. |
| 4 | 12 | 12 | x | x | Must go beyond the {0, 1} field to find a new linearly independent coding: "12". |
| 5 | 01 | — | x | x | $U_1$ is full rank so only $U_2$ and $U_3$ are considered. None receives. |
| 6 | 01 | — | x | 01 | $U_3$ receives the second regular packet. |
| 7 | 01 | — | 01 | — | $U_1$ and $U_3$ are full rank so only $U_2$ is considered. $U_2$ receives the second regular packet. |

With reference to Table III below, yet another example of a transmission scenario will be described. In this particular example, we consider a sender with three regular data packets to be transmitted to three receivers/users $U_1$, $U_2$ and $U_3$.

TABLE III

| TX# | Set | $U_1$ | $U_2$ | $U_3$ | Comments |
|---|---|---|---|---|---|
| 1 | 001 | 001 | x | x | $U_1$ receives the third regular packet. |
| 2 | 010 | x | 010 | x | $U_2$ receives the second regular packet. |
| 3 | 100 | x | 100 | x | $U_2$ receives the first regular packet. |
| 4 | 101 | 101 | x | x | May not send 110 (as the rank for $U_2$ would not increase), but 101 and 011 OK. $U_1$ receives composite packet based on weights 101. |
| 5 | 011 | x | x | 011 | $U_3$ receives composite packet based on weights 011. |
| 6 | 111 | x | x | 111 | $U_3$ receives composite packet based on weights 111. |

TABLE III-continued

| TX# | Set | $U_1$ | $U_2$ | $U_3$ | Comments |
|---|---|---|---|---|---|
| 7 | 211 | x | 211 | x | Must go beyond the {0, 1} field to find a new linearly independent coding: 211. $U_2$ receives composite packet based on weights 211. |
| 8 | 110 | 110 | — | x | $U_2$ is full rank so only $U_1$ and $U_3$ are considered. |
| 9 | 001 | — | — | 001 | $U_1$ and $U_2$ are full rank so only $U_3$ is considered. |

It is noted in Table II that each user only receives two different data packets, which may be composite data packets, regular data packets or a combination of both. It can also be confirmed that each user is able to determine the two regular data packets as it has been ensured that each user in each transmission is guaranteed to receive a new linear combination of regular data packets. The same applies to table I and table III.

As noted above, the special possibility to adaptively select a weight vector having at least two different non-zero coding weights enhances the ability to always form a composite data packet that represents a new linearly independent coding of regular data packets different from any data packet (regular data packet or composite data packet) previously received by each receiver for all or a relevant subset of the receivers during the multicast session. Under certain circumstances, especially when the number of users is large, this may be important since the ability to transmit new linearly independent data packets (regular and/or composite data packets) for each receiver in at least a majority of the transmission instances during a multicast session will significantly improve the throughput performance for reliable multicasting.

In general, by systematically transmitting a number of multicast or general data packets (regular and/or composite data packets) that are linearly independent from any multicast data packet (regular data packet or composite data packet) previously received by a set of receivers during a multicast session it will be sufficient to send merely N such data packets to retrieve all N regular data packets, thus obtaining maximum throughput. If however a receiver receives more than N data packets which are only based on N regular data packets, it will still just be possible to retrieve the N regular data packets.

Compared to conventional multicast ARQ, the invention requires fewer multicast data packets to be sent from the sender to the receivers to ensure correct reception of transmitted data packets. The invention provides a strategy for reliable multicasting with deterministic bounds on the number of packets that need to be received for decodability.

In an exemplary embodiment of the invention, it is also possible to form multiple data packets at a given scheduling instance and transmit multiple composite packets in a burst. At such a scheduling instance, multiple composite data packets are normally formed using the same feedback information so that the multiple composite data packets are dependent of each other (although each of them is still linearly independent of previously received packets by each receiver of the relevant set of receivers as well as in the burst foregoing transmitted composite packets). If this is enforced systematically at a plurality of scheduling instances it may be possible to reduce the feedback signaling required for transfer of a given amount of multicast information.

Figure 3:
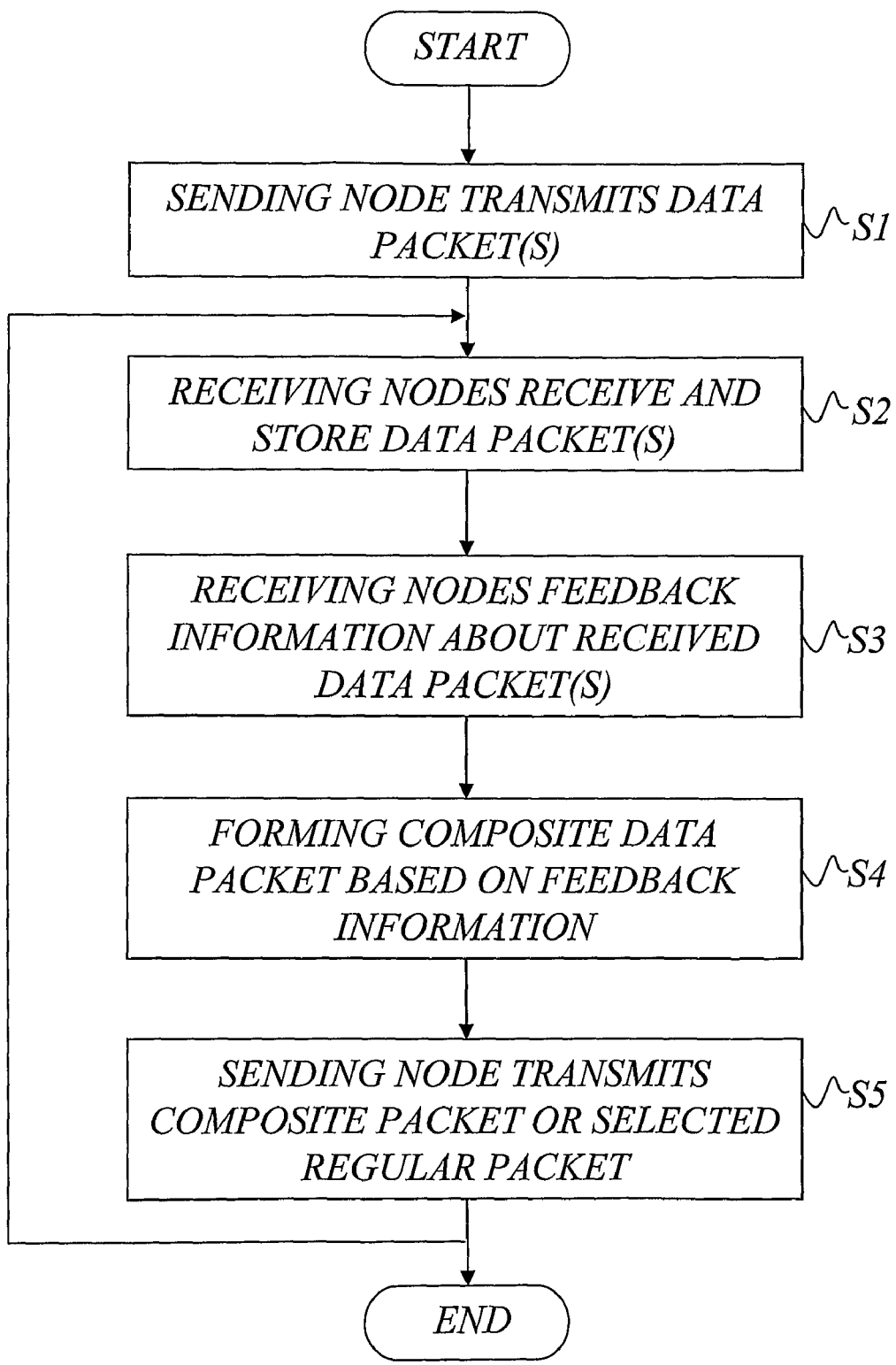
FIG. 3 is a schematic flow diagram illustrating an exemplary overall ARQ procedure.

For a better understanding of the invention, an exemplary overall ARQ procedure will now be described briefly with reference to the schematic flow diagram of FIG. 3.

In step S1, one or more data packets is/are sent from one or more nodes in sending operation to at least two receiving nodes. Each individual data packet is intended for all considered receiving nodes, i.e. the data packets are "multicast data packets". The transmission of data packets may occur concurrently or subsequently, depending on transmission technology. In step S2, the receiving nodes store the respective data packets that were correctly received (correctly demodulated and FEC decoded). In step S3, the receiving nodes feed back information of the packets they have received to the sending node(s). In step S4, the sending node forms, if advantageous, a composite multicast data packet by using the feedback knowledge of received data packets from the receiving nodes 110, 120, or alternatively sends a regular multicast data packet. The composite multicast data packet is normally formed based on multiple selected regular multicast data packets to be (re)transmitted. For example, the number of bits in the composite multicast packet may advantageously be less than the sum of the number of bits of the parts of the packets that are jointly encoded. The sending node may form a plurality of different composite multicast packets for transmission, possibly in combination with transmission of regular multicast data packets, to optimize the throughput efficiency. In step S5, the sending node transmits the composite multicast data packet or a selected regular multicast data packet to all receiving nodes. After receiving the composite multicast data packet, the receiving nodes decode, if possible, the composite multicast data packet and extract respective multicast data that was previously unknown to the respective receiving node. In the decoding and extracting process, multicast data packets previously FEC decoded by the receiver, are preferably utilized.

In this context, the invention specifically targets the forming (encoding) of composite packets and the decision (scheduling) of which regular data packets to use (and how) in each composite data packet. In a sense, the formation of a composite data packet can be regarded as a joint scheduling and encoding procedure. This mainly concerns the sender side, as illustrated in schematic flow diagram of FIG. 4. In step S11, the sender receives feedback information indicating received data packets from the receivers. As previously mentioned, a key feature of the invention is to form at least one composite multicast data packet as a weighted linear combination of regular data packets based on a carefully selected set of coding weights, as indicated in Step S12 and S13. The coding weights for at least one composite data packet are adapted in step S12 based on feedback information about previously received data packets such that the composite packet represents a new coding of regular data packets linearly independent of any data packet previously received by each receiver in a relevant set of receivers during a multicast session. This means that the coding weights are adaptively selected in response to each receiver's previously received packets, through the feedback, to ensure a new linearly independent coding of regular data packets. In step S13, the composite data packet is formed, preferably by multiplying the regular data packets with the corresponding adapted coding weights. In step S14, the formed composite data packet is transmitted to the receivers. As illustrated in the overall ARQ flow of FIG. 3, the procedure is preferably repeated until all regular packets in the multicast session have been transferred to all relevant users of the multicast group.

Figure 4:
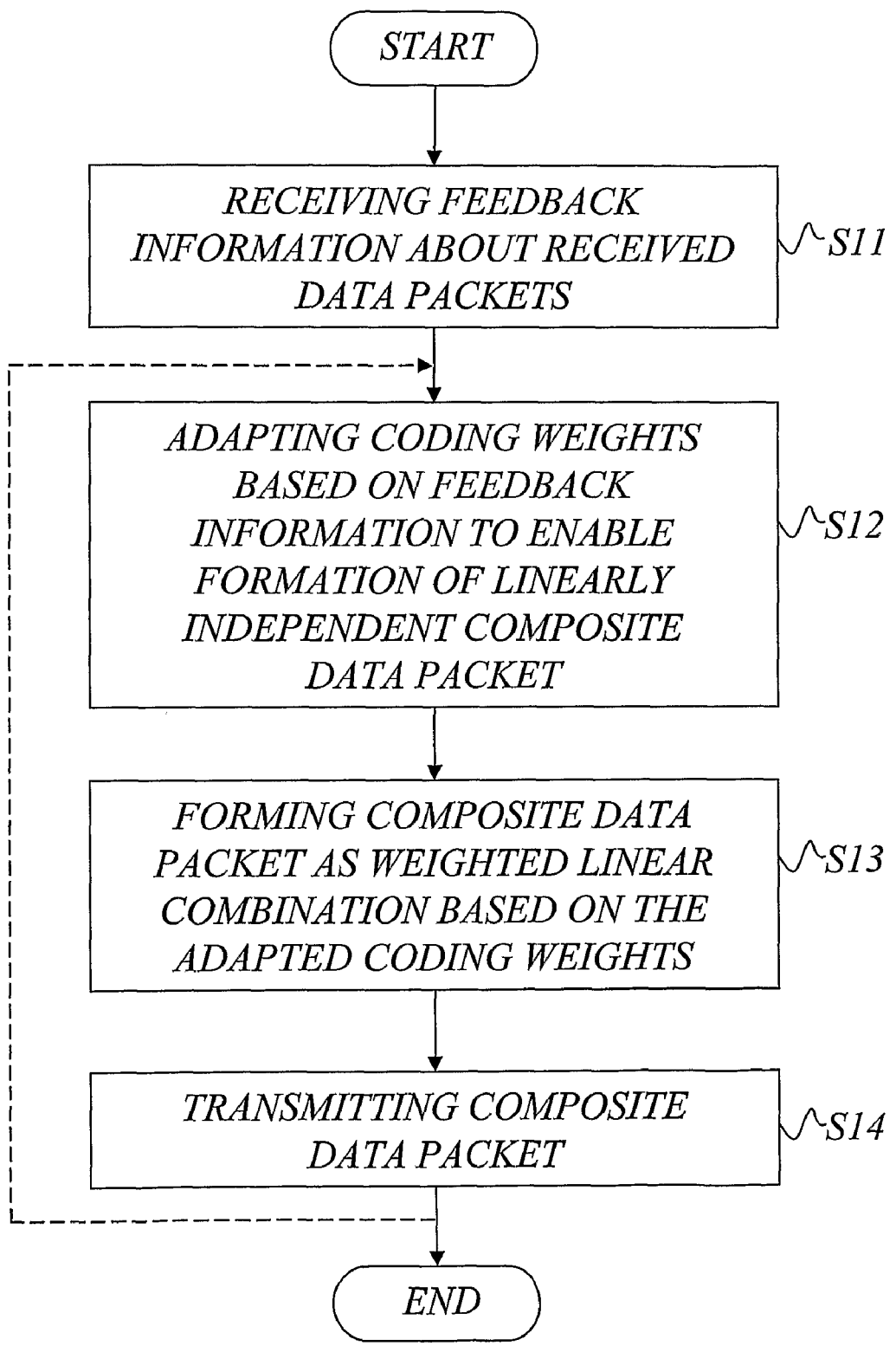
FIG. 4 is a schematic flow diagram of a method for scheduling and encoding regular data packets into a composite data packet according to a preferred exemplary embodiment of the invention.

Optionally, several composite data packets may be formed and transmitted at a given scheduling instance by repeating steps S12-S14 as indicated by the dashed line in FIG. 4. This will be described in greater detail later on.

The feedback from the receiving nodes to the sending node may preferably be a part of an acknowledgment (ACK) procedure. The feedback messages can typically be composed in various ways, for example depending on the transmission protocols used, the ARQ procedure and so forth.

Various encoding methods and formats may be used with the invention, as will be described in detail later on.

It should be understood that with the present invention there is nothing that prevents the overall procedure to start in step S1 (see FIG. 3) by transmitting a composite data packet.

It should also be noted that transmissions could occur at the same time if a transmission technology allowing for concurrent transmissions, for example Orthogonal Frequency Division Multiple Access (OFDMA), is utilized, i.e. a first packet and a second packet are sent concurrently but on non-overlapping sets of OFDM sub carriers. The re-transmission could also occur concurrently.

In a more mathematical approach to explain the invention, the previously received multicast data packets (regular and/or composite data packets), for each receiver, can be described as a linear system of equations based on a matrix of weight vectors. For a previously received composite data packet the weight vector denoted ω will include a set of coding weights, whereas for a previously received regular data packet the weight vector will include a single non-zero coding weight. At the encoding and scheduling instance, when forming a new composite data packet for transmission to the receivers, the idea is to adaptively select the coding weights of the weighted linear combination of regular data packets based on feedback of previously received data packets such that the rank will increase for each considered receiver's linear system of equations. The increase in rank corresponds to the formation of a new linearly independent row in each receiver-specific matrix of weight vectors, which is equivalent to a new linearly independent coding of a multicast data packet.

Now, with each user having received one or more multicast data packets (regular and/or composite data packets) one may see this as a system of linear equations where the transmitted multicast data packets are known, the weightings are known, and each of a set of receivers wants to solve its linear system of equations in order to determine and decode the regular data packets. On the transmitter side the aim is to generate (schedule and encode) an appropriate system of equations, and on the receiver side the goal is to solve (decode) the linear system of equations and extract the regular data packets.

If a new linearly independent multicast data packet is transmitted each time such that the rank will successively increase for each received data packet (for each user receiving the data packet), or at least a majority of the times, the throughput efficiency will be significantly improved. In the former case when a new linearly independent multicast data packet is transmitted each time, the decodability of N regular data packets can be guaranteed when merely N data packets have been received, since the matrix of weight vectors will include N linearly independent rows from which all N regular data packets can be retrieved. Since the rank of the matrix increases for each received data packet, it will suffice to ensure that all users have received just N data packets to decode and retrieve all N regular data packets.

Moreover, to ensure that the rank increases for all or a subset of the considered receivers, the inventors have recognized that it is sometimes not sufficient to use weights that can only assume the values 0 and 1. Sometimes, when the number of receiving nodes is large in relation to the number of regular packets that one aims to transfer, it will be beneficial to use a weight vector that has at least two different non-zero coding weights, as previously explained.

Note that the while the linear combination can in principle be performed with regular arithmetic, causing carry bits to be generated for the composite packet, it is preferable to use a metric that ensures that the composite packet length is substantially the same as for the regular packets. Hence, arithmetic based on finite fields is preferred and assumed in the following. A possible type of arithmetic is the so called modulo arithmetic, but the invention is not limited hereto. Also note that the linear coding operation may be performed on the full data packet, or alternatively the regular data packets are divided into multiple more manageable substrings on which the same linear coding operation is performed.

Note that in the following, it will be assumed that we operate with any type of arithmetic that provide the same rules as in traditional arithmetic that allows generating (scheduling and encoding) and solving (decoding) a linear system of equations. Hence, without loss of generality, equations will be written with a traditional arithmetic notation in the following.

First, each users a priori information, i.e. previously received general multicast data packets (regular and/or composite data packets), can be described as a linear system of equations according to $$\begin{bmatrix} c_1^{(k)} \\ \vdots \\ c_{M_k}^{(k)} \end{bmatrix} = \begin{bmatrix} w_{1,1}^{(k)} & \cdots & w_{1,N}^{(k)} \\ \vdots & \ddots & \vdots \\ w_{M_k,1}^{(k)} & \cdots & w_{M_k,N}^{(k)} \end{bmatrix} \cdot \begin{bmatrix} d_1 \\ \vdots \\ d_N \end{bmatrix}, \quad (1)$$

where $d_n$ is the value of the n:th regular packet, $c_{m_k}^{(k)}$ is the value for the $m_k$:th general multicast data packet for user k, $w_{m_k,n}^{(k)}$ is a weight factor for user k and regular packet n and received general multicast data packet $m_k$ by user k, $M_k$ is the last received data packet by user k, and N is the total number of regular packets to be communicated. Note that each user may have received different number of multicast data packets, and therefore the index k on the variable $M_k$.

Now, to simplify the notation, we may write (1) in a matrix form for user k:

$$C_k = W_k D \quad (2)$$

Generating (encoding) and solving (decoding) the system of linear equations may as have been indicated earlier be performed with normal arithmetic, "modulo arithmetic" or any other suitable arithmetic.

The values that the weights $w_{m_k,n}^{(k)}$ may assume are typically limited in number. Further, the invention does not specifically impose which values one may assume for the weights, those could be selected from an arbitrary set like $\{0, \ldots, 3\}$ or even some more imaginative arbitrary set such as {0, 1, 2, 3, 5, 7, 11, 13}. The greater number of values that can be assumed, the greater degree of freedom is introduced that helps to find a code vector that may be used to form a composite data packet. Also, the greater number of packets involved the greater degree of freedom that helps to find a code vector that may be used to form a composite data packet.

However, the alphabet for the weights of the code vectors must typically be large enough to get sufficient degree of freedom to allow all considered users to obtain N linearly independent equations. The alphabet does however not have to be very large. Simulations show that for K=20 users, N=6 packets, where the reception probabilities for the users are independent and each reception probability is here assumed to be p=0.05, the alphabet size (or equivalently base b) it is sufficient with only 3 elements {0, 1, 2} (or equivalently base b=3).

To get an idea of the minimum value for the base b (or equivalently the minimum number of elements in the alphabet), we know that the number of codeword words $b^N$ must be greater than that each of the K users receives, in the worst case, N different multicast data packets. Hence, the condition is $b^N > N \cdot K$. While, this is not a perfect estimate, it still indicates that b, N and K are interrelated. There is also normally a dependency on the reception probability p as with a high reception probability, there is a high likelihood that several users receive the same data packet.

Also note that it is possible that a row in $W_k$ and the code vector or weight vector $\omega$ to contain just a single non-zero element. This is equivalent to sending merely a single regular packet for the general multicast data packet. The invention preferably uses arithmetic of finite fields that may use more elements than just "0" and "1". When the number of users is large and the number of regular data packets to transfer is small, this will guarantee finding new linear combinations.

In a systematic approach, when it is desirable to find a new linear combination each time, the core operation is as follows:
  Consider a multicast group of users, where users are indexed by k
  With N regular data packets to multicast
  For each user k, retrieve the weight matrix $W_k$
  $\forall$k select a code vector $\omega$ such that Rank($W_k'$)=Rank($W_k$)+1, where $$W_k' \triangleq \begin{bmatrix} W_k \\ \omega \end{bmatrix}$$

for those k that Rank($W_k$)<N
  Form and send a composite packet based on the code vector to $\omega$
  Update all weight matrices based on feedback of reception
Another equivalent formulation also yielding a rank increase is the following:
  Consider a multicast group of users, where users are indexed by k
  With N regular data packets to multicast
  For each user k, retrieve the weight matrix $W_k$
  Determine the nullspace to $W_k$ and denote it $\Xi_k$
  $\forall$k select a code vector $\omega$ such that $\Xi_k \cdot \omega^T \neq [0, 0, \ldots, 0]^T$ for those k that Rank($W_k$)<N
  Form and send a composite packet based on the code vector $\omega$
  Update all weight matrices based on feedback of reception
As previously explained, another way of formulating this is to say that one selects the coding weights such that a new linearly independent coding of the regular data packets is sent each time.

The above operation ensures that any user receiving a general multicast data packet will always increase its rank. When a user has received N multicast data packets, the system of equations will have N linearly independent rows, i.e. full rank. Hence, the user may decode all regular data packets when only receiving the minimum number of general multicast data packets. As it may take longer time for some user to receive their N multicast data packets, some other users may receive their required N multicast data packets and then some subsequent data packets which are redundant and can be discarded (or not received).

A possible approach for finding a suitable code vector $\omega$ is based on iteratively testing hypothesis of tentative code vectors $\omega$. For example, select an alphabet (i.e. a field) of values that the elements of the code vector $\omega$ may assume. Given the alphabet, order a list with all possible permutations, i.e. a list having $b^N$ candidate code vectors (where b is the number of elements in the field and N is the number of regular data packets to be transferred). Go through the list from the start towards the end (or rather as far as needed) and in turn assign each item in the list as a candidate code vector $\omega$. For each candidate code vector $\omega$, test whether the condition according to the encoding/scheduling algorithm (i.e. the rank increases or alternatively the non-zero vector projection of $\omega$ on the null space) for all users with non-full rank weight matrices is granted. If the condition is fulfilled, select the candidate code vector as the code vector $\omega$.

Practically, a candidate code vector may be created by adding the value "1" to the previous candidate code vector, i.e. simply a counter. To enable a suitable set of values for the weights, e.g. from zero up to some number b−1, the candidate code vector may use and count with base b, where each digit will correspond to a weight.

As an alternative to counting upwards with base b for the next code vector candidate, one may instead go through all or a set of words with weight "1", i.e. only one weight is non-zero, and then all or a set combinations of words with weight "2" and so on. The idea here is to keep the number on non-zero weight elements as low as possible to minimize encoding and decoding complexity. For at least one code vector, however, there will be at least two non-zero coding weights, in accordance with the invention.

As an alternative, it may be possible to determine the code vector directly from null spaces of the weight matrices. For each user k, consider the weight matrix $W_k$ and determine an associated null space and denote it $\Xi_k$. For each user k, we now have to generate a code vector $\omega$ with the property that it has a non-zero projection onto at least one of the vectors in $\Xi_k$. We know that if the code vector $\omega$ is selected as one of the basis in $\Xi_k$, let's say the first null space vector $\xi_k$, one will have the desired non-zero projection for that user. However, we have to ensure that this is true for all or at least a given subset of users. One way to approach this is to form a superposition over all considered user's first null space vector $\xi_k$ in $\Xi_k$. Yet, one needs to avoid that any vector $\xi_k$ is cancelled by the other $\xi_k$ due to the superposition. If this is not achieved, one may alter weights for the superposition or choose one or more $\xi_k$ as not the first vector in their respective null space $\Xi_k$. Hence, the task is to find a code vector $\omega$ such that $\xi_k \cdot \omega \neq \forall k$, where "·" is the scalar product.

As an alternative or complement, it may also be possible to approach the idea from an optimization point of view as there are numerous different candidate code vectors $\omega$ that could be selected at each instance. The objective of the optimization should preferably be to ensure that only a low number of encoding and decoding operations are required, i.e. in essence making $W_k$ as sparse as possible. Such optimization criteria for ω may be heuristic according, but not limited, to:

Minimize ω·1, where 1 is the column vector of ones. or,
Minimize the set of non-zero elements in ω or,
Minimize ω·ω$^T$, where T is the vector transpose On the sender side, to keep the complexity as low as possible, e.g. when determining the rank, an implementation of this algorithm may use results and processed versions of weight matrices from the previous computation round. For instance, using the result from Gaussian elimination performed on the last rounds $W_k'$ is the new $W_k$ if the packet was successfully received by user k. Rank calculation for a new $W_k'$ for the next round may be based on the Gaussian eliminated form of $W_k'$ from the previous round with a tentative code vector ω amended.

Similarly to the sender side, the receiver side may use results and processed versions of weight matrices from the previous multicast data packet reception. For example, the result from earlier Gaussian elimination(s) may be used.

Encoding Methods

An example of encoding suitable for the present invention is preferably based on XOR bitwise encoding, due to its simplicity. The XOR operation corresponds to coding weights one as discussed previously.

Many different methods to jointly XOR encode and then identify which packets are jointly coded together may be envisioned.

Figure 5:
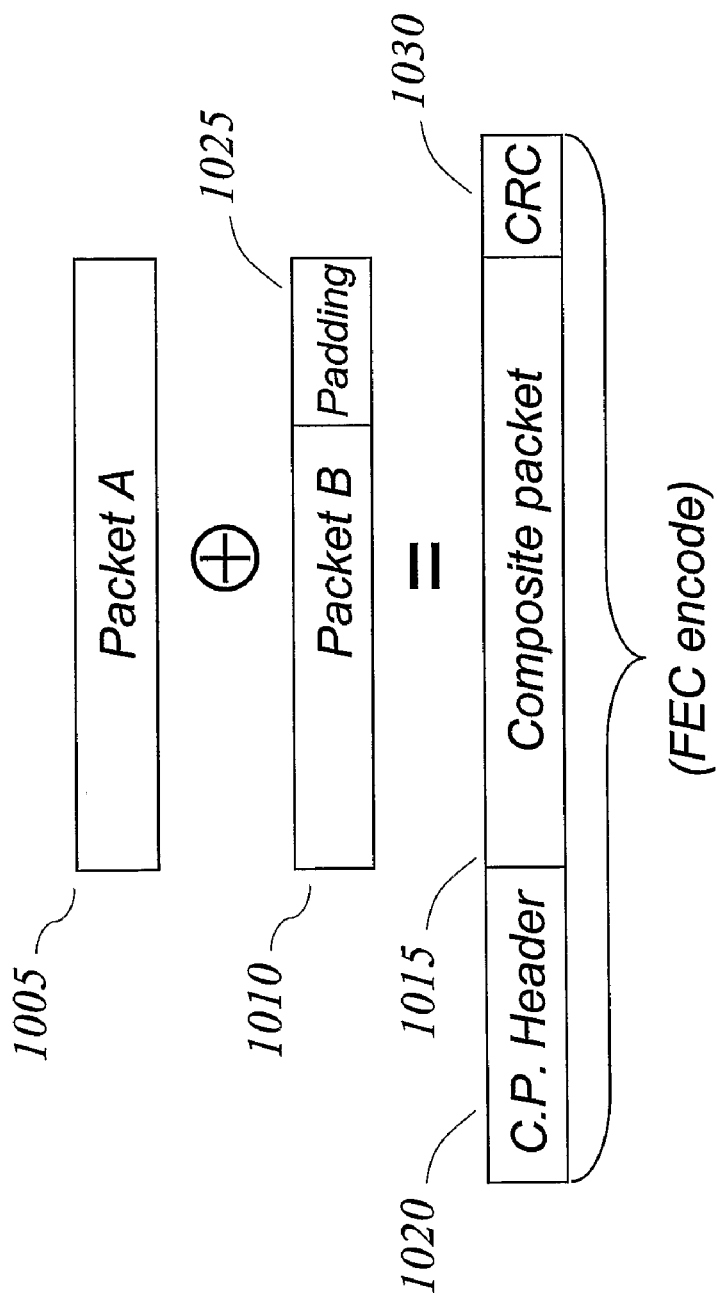
FIG. 5 illustrates a possible embodiment of encoding two regular data packets into a composite data packet.

An example of possible code-frame formats is given with reference to the illustrations of FIG. 5. In this example, two data packets (A) 1005 and (B) 1010 are jointly coded to form the composite multicast data packet 1015. The payload can be XORed directly, but means for identifying, which individual packets where encoded together need to be offered. In the exemplary encoding method of FIG. 5, identifiers (e.g. headers or subsets of relevant information from individual packet headers) of the involved jointly encoded packets (here only two packets are shown, but the idea can easily be extended to more packets) are signalled in a composite packet header 1020. An identifier may for instance comprise sender address, multicast address, and packet sequence number for each encoded packet. Apart from the identifiers, the composite packet header preferably also signals the format of the composite multicast packet, i.e. where the packets are placed in the composite multicast packet. For instance, if there are two packets and one of the packets contains fewer bits than the other packet, as in FIG. 5, the number of bits contained in the packet with fewer bits as well as the position of the first bit of the shorter packet is normally also indicated. When the number of bits differs, padding 1025 is utilized, as in FIG. 5 with packet B 1010. The format field of the composite packet header 1020 could also signal that two packets B and C are concatenated one after the other (not shown) and then encoded with e.g. a third packet A or more packets. The entire composite packet including the header is then preferably FEC encoded.

After correct FEC decoding and detecting a correct CRC 1030, the exemplified composite packet header enables easy identification of which packets have been encoded together. The receiver may then use this information to fetch an a priori known packet from the decoded data packet storage, and extract the other packet(s). It should be noted that the composite packet header may also contain other information. Another packet format version (not shown) than the one illustrated above is to signal the composite packet header in a common broadcast message, i.e. a sort of out-of-band signalling, while encoding the payloads of multiple packets. Yet a further encoding method (not shown), could involve a blind identification approach, i.e. testing hypothesis of encoded messages, where both headers and payload of packets are coded together, against the database of a priori information and using a CRC check to test the validity of the hypothesis testing.

The present invention is not limited to the use of XOR-operations in the encoding of the composite data packets. The XOR operation is a linear summation over the field F(2) with the elements {0,1}. As mentioned above, the inventor has realized that when the number of receivers increases, it becomes important to extend the field with more elements to enable that the rank for each receiver's matrix may increase at each transmission. Hence the field may be extended to 3 elements {0, 1, 2}, four elements {0, 1, 2, 3} and so on. In general, it is well known in general coding theory that the fields need to have $p^m$, elements where p is a prime number and m is a positive integer, in order to be well defined. It is also well known that same-sized fields are isomorphic in the sense that it does not matter if the field contains different elements, let's say {0, 1, 2} or {2, 3, 7}. In addition to identifiers (e.g. headers or subsets of relevant information from individual packet headers) of the involved jointly encoded packets the values of the weight vectors used when the field is larger than two elements, as discussed above, are preferably also signalled in a composite packet header 1020.

A further example of an encoding operation suitable to use in the method according to the invention is based on the modulus operator operating on signal constellations, i.e. after FEC encoding and modulation. Per signal constellation symbol encoding is considered in the following, and the procedure can be repeated for multiple consecutive signal constellation symbols. The modulus operation is in this example performed both for the real and imaginary part independently when handling complex numbers and utilize a definition of the modulus operation and the mathematical observation that:

$$((A+B) \bmod L - B) \bmod L = (A) \bmod L,$$

which indicates that a real valued signal B can be superimposed on a real valued signal A and allow undisturbed recovery of the signal A (as long as the signal A does not exceed the quantization level L), while the amplitude (and hence the power) is limited of the (non-linearly encoded) composite signal.

In practice, this can be used as follows. The sender has symbols $S_1$ and $S_2$ that typically assumes distinct values. For instance in 16 QAM, $S_i \in \{-3, -1, 1, 3\} + i \cdot \{-3, -1, 1, 3\}$. Now, as the receiver has knowledge of the data sequence $D_2(n)$, it also has knowledge of the corresponding symbol $S_2$ (for every $S_1$). Then for the real part (and equally for the imaginary part), the jointly and encoded signal at the transmitter is $$(S_1^{(Re)} + S_2^{(Re)}) \bmod L,$$

which is then received and equalized, i.e. compensated for path loss (ensuring that same scale is used for the received signal and the signal that is subtracted), and complex phase (ensuring respective In-phase and Quadrature phase axis are aligned with the signal that is subtracted), to yield the received signal $$R^{(Re)} = (S_1^{(Re)} + S_2^{(Re)}) \bmod L + N^{(Re)},$$

where $N^{(Re)}$ is the noise (and interference) term. The desired signal is then recovered with $$\hat{S}_1^{(Re)} = ((R^{(Re)}) \bmod L - S_2^{(Re)}) \bmod L = (S_1^{(Re)} + N^{(Re)}) \bmod L$$

The encoding could also be accomplished by quantization by means of a higher dimensional lattice than just one dimensional quantization as has been described above. In this case the quantization operates on a vector rather than a scalar.

Commonly, a receiving node may not have the full information needed to fully decode and extract own data from the composite multicast data packet immediately, but have to wait to receive more data packets. If this is the case the receiving node may partly decode the composite multicast data packet, and store the result, a residual composite multicast data packet, for further processing when further information is available. This decoding may, for each receiver, be performed by calculating the reduced row echelon form in accordance with the current code matrix and perform an updated reduced row echelon form for every received new data packet (regular or composite). Alternatively the composite multicast data packet is stored without attempting to decode, until the receiving node has acquired all required information. Information on the information required to decode the major part of the composite multicast data packet may for example be comprised in a header. Also this decoding could be performed by a reduced row echelon form approach. Each receiver is in essence interested of inverting the code matrix (within the field it is using) and multiplying this with the received data packets. To be precise, this has to be done, as for the encoding operation, for each substring of bits which the data packet is divided into.

By utilizing regular and composite data packets, and by letting both the sending node (through feedback information) and the receiving node exploit this information, it is possible to reduce the number of transmissions needed to transfer a certain amount of data from one node to another. This will enhance the aggregate throughput as well as the single user (or equivalently, node) throughput. In addition, the end-to-end latency characteristics will be improved. Alternatively, depending on the conditions, the reduced number of transmissions can be used to improve power and energy efficiency in a communication system with a sender and multiple receivers.

It should be understood that the sender may utilize and exploit all available feedback information about received data packets. In addition to the feedback information discussed above, supplementary information such as Quality of Service (QoS) information and data packet characteristics may also be used when forming the composite data packets.

Figure 6:
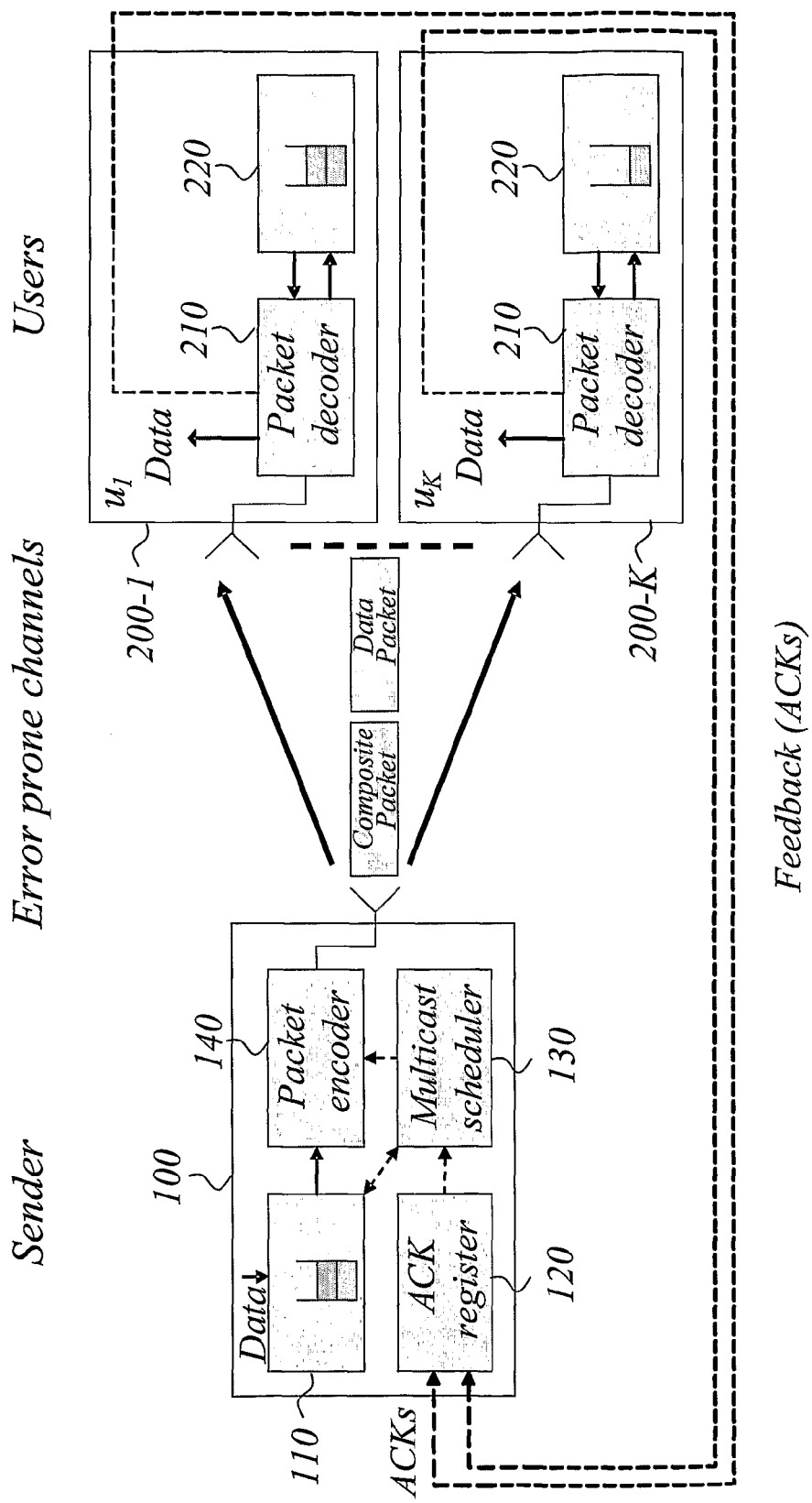
FIG. 6 is a schematic block diagram illustrating a system for multicast transmission of data packets from a sender to multiple users according to a preferred exemplary embodiment of the invention.

FIG. 6 is a schematic block diagram illustrating a system for multicast transmission of data packets from a sender to multiple users according to a preferred exemplary embodiment of the invention.

The modules and blocks described below may, depending on the chosen implementation, be regarded as functional parts of a sending and/or receiving node in a communication system, and not necessarily as physically distinctive objects by themselves. Connections could thus be interpreted as links between functional parts and not necessarily physical connections.

The overall system is based on a sender 100 communicating with a number of users 200-1 to 200-K through more or less error prone communication channels or links.

The sender such as sending node 100 basically comprises a data buffer module 110, an ACK register 120, a multicast scheduler 130, a multicast packet encoder 140 as well as some form of transmitting means, which provides the necessary functionalities for performing the actual multicast transmission.

The sender may also comprise means for handling unicast information (not shown).

The data buffer module 110 temporarily holds data packets for subsequent scheduling/encoding and transmission to the users/receivers 200.

Typically, as previously discussed, the sending node 100 first sends one or more regular data packets. As feedback information becomes available from the receivers and composite multicast packets can be formed, the sending node may also form and send one or more composite multicast data packets.

The multicast scheduler 130 considers what data packets that reside in the data buffer module 110, and also considers ACK information from the different receiving nodes stored in the ACK register 120.

Figure 7:
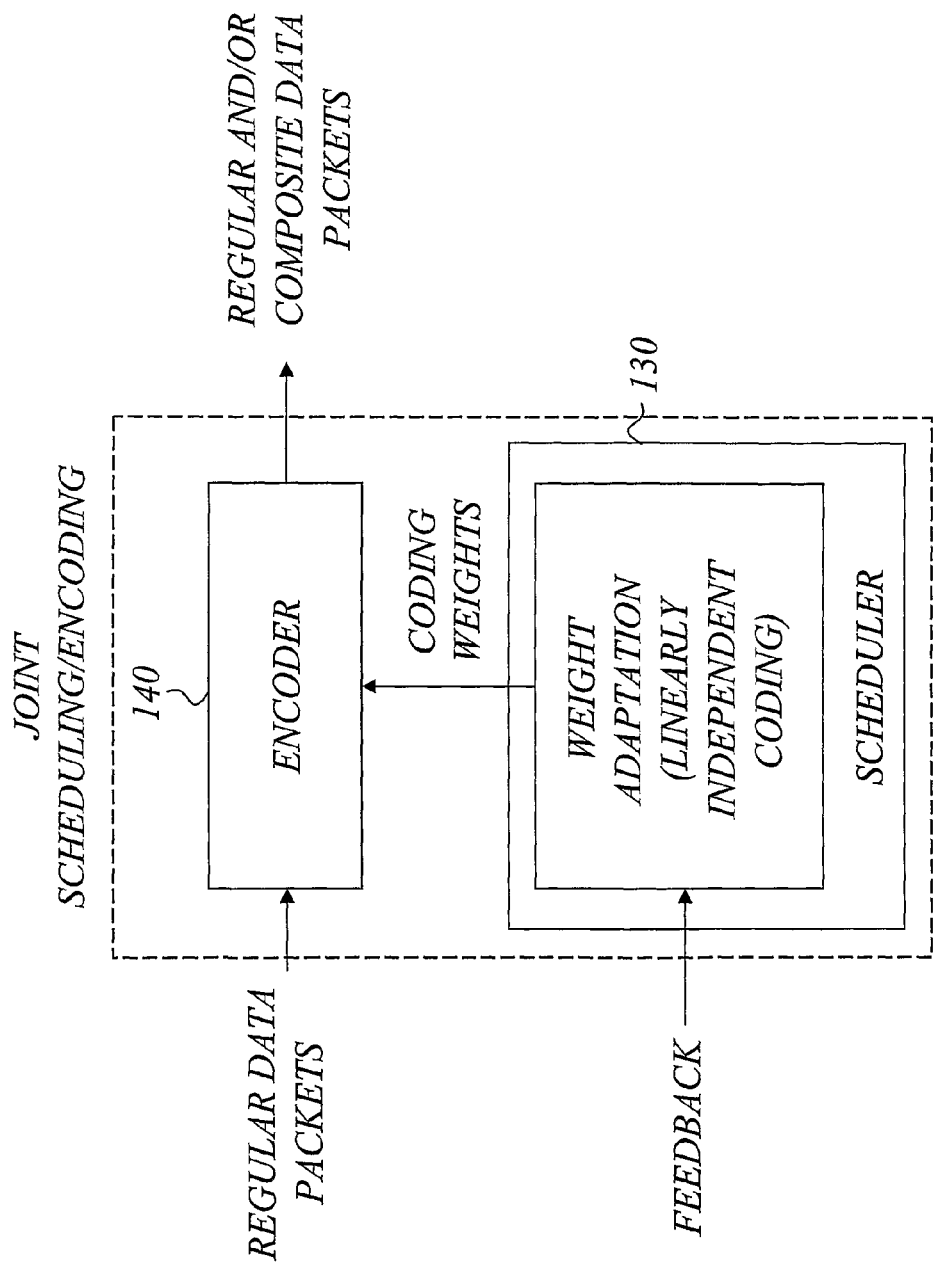
FIG. 7 is a schematic block diagram of data packet scheduling and encoding according to an exemplary embodiment of the invention.

Basically, the multicast scheduler 130 performs the scheduling of regular data packets available in the data buffer module 110 by determining a set of coding weights based on the ACK feedback in the ACK register 120. The multicast scheduler 130 informs the multicast data packet encoder 140, which forms or encodes a composite multicast data packet as a weighted linear combination of regular data packets based on the selected coding weights. This so-called joint scheduling and encoding is illustrated in detail in FIG. 7. The multicast scheduler 130 has a functional module for determining/adapting the weights such that a new linearly independent coding can be formed as and when required. As pointed out previously, this coding may in a specific embodiment be based on a set of coding weights (this set of weights is also referred to as a coding vector) that includes at least two non-zero coding weights.

The multicast scheduler 130 is typically configured for handling the regular/conventional multicast ARQ operations.

Supplementary knowledge may also be used for the scheduling. Supplementary information may include, but is not limited to: QoS requirements for the possibility to cater for QoS scheduling aspects, as well as status of individual packets such as their time to live value.

A receiver such as a receiving node 200 basically comprises receiving means, which provides the necessary functionalities for performing the actual reception, a multicast data packet decoder 210 with feedback functionalities, as well as a data buffer module 220. The data buffer module is normally configured for storing data packets that have not yet been delivered to k receiving units.

When a composite packet is received, the decoder 210 of the receiver 200 normally identifies which packets have been encoded together. Using the regular multicast data packets, or composite multicast data packets, or both, stored in the buffer module 220 the decoder tries to decode the composite multicast packet to extract individual regular data packets. The decoder 210 is also configured for issuing and handling feedback messages, including ARQ-related messages.

After a receiver 200 has successfully received a multicast data packet (regular data packet or composite data packet), it sends an ACK message to the sender 100 to confirm that it has received the packet, immediately or with a slight delay. The delay may be useful for not occupying resources and waste energy unnecessarily due to the overhead of each feedback packet. The update is preferably achieved via the ARQ means of the receiver and the ARQ means of the sender.

Moreover, note that a receiver 200 may also act as a sender if the data is subsequently forwarded. The same is true for the sender 60, i.e. it may also act as a receiver for other data.

The embodiments described above are merely given as examples, and it should be understood that the present invention is not limited thereto. Further modifications, changes and improvements which retain the basic underlying principles disclosed and claimed herein are within the scope of the invention.

APPENDIX A

A simulator based on the algorithm of rank increase requirement for each transmitted multicast data packet for every user that increases with one step in each iteration round was built.

The following simulation end results represent the weight matrices for three users to which five multicast data packets are to be sent in i.i.d packet erasure channels where the reception probability p=0.1 and the weight vector used base b=3. Note that at most a single row is added at each instance to those matrices when they are built up, and those matrices shown here represent the case of the first five received multicast data packets. It is easy to confirm that each weight matrix has full rank and that the encoded data packets can all be retrieved for each user.

$$W_1 = \begin{bmatrix} 0 & 0 & 0 & 0 & 1 \\ 0 & 0 & 0 & 1 & 0 \\ 0 & 1 & 0 & 0 & 0 \\ 0 & 1 & 1 & 0 & 0 \\ 1 & 0 & 0 & 0 & 0 \end{bmatrix}, W_2 = \begin{bmatrix} 0 & 0 & 1 & 0 & 0 \\ 0 & 0 & 1 & 0 & 1 \\ 1 & 1 & 0 & 0 & 1 \\ 1 & 1 & 0 & 1 & 0 \\ 1 & 2 & 0 & 0 & 0 \end{bmatrix},$$

$$W_3 = \begin{bmatrix} 0 & 0 & 1 & 1 & 0 \\ 0 & 0 & 1 & 1 & 1 \\ 0 & 0 & 1 & 2 & 0 \\ 1 & 0 & 0 & 0 & 0 \\ 1 & 1 & 0 & 0 & 0 \end{bmatrix}$$

Further simulation with other number of packets and number of users have experimentally confirmed that full rank can always be achieved provided the base b of the weight vector is chosen large enough to cater for sufficient number of combinations to test.

It is noted that the performance is roughly T≈p when p≠1 for all K, independently of the number of packets. The invention allows optimal throughput efficiency for fully reliable multicast, i.e. T=p when throughput efficiency is analyzed for infinite number of packets.

The scheme of the invention is deterministically decodable, i.e. in contrast to Fountain Coding (FC) it suffices to receive exactly just the same number of encoded packets to retrieve the same amount of regular data packets. The FC performance, determined by the factor 1+ε, is dependent on the number of packets that are sent. FC requires a large number of packets, in the order of 1000 and more, to offer a low ε. There is no such dependency with the proposed invention.

REFERENCES

[1] J. W. Byers, M. Luby, M. Mitzenmacher, and A. Rege. A digital fountain approach to reliable distribution of bulk data. In Proceedings of ACM SIGCOMM, pages 56-67, 1998.

[2] J. Byers, M. Luby, and M. Mitzenmacher, "A digital fountain approach to asynchronous reliable multicast", IEEE Journal on Selected Areas in Communications, 20(8), October 2002.

[3] J. Sachs, M. Meyer, S. Wager, H. Huschke, M. W. Larsson, P. Larsson, "Method and devices for efficient data transmission link control in mobile multicast communication systems". US Patent Application 2006/0154603.

[4] P. Larsson, N. Johansson, "Multi-User ARQ", In conference proceedings of VTC2006spring, Melbourne, 7-10 May, 2006.

[5] Shen Yong, Lee Bu Sung, "XOR retransmission in multicast error recovery", (ICON 2000), Proceedings, IEEE International Conference on Networks, pages 336-340, 2000.

[6] M. A. Jolfaei, S. C. Martin, J. Mattfeldt, "A new efficient selective repeat protocol for point-to-multipoint communication", 1993. ICC 93. Geneva. Technical Program, Conference Record, IEEE International Conference on Communications, Volume 2, 23-26 May 1993, pages: 1113-1117 vol. 2.

[7] M. A. Jolfaei, U. Quernheim, "Effective Block Recovery Schemes for ARQ Retransmission Strategies" IEEE Int. Symposium on Personal, Indoor and Mobile Radio Communications, 1994. Wireless Networks—Catching the Mobile Future. 5th Volume 3, Issue, 18-23 Sep. 1994 Page(s):781-785 vol. 3.

The invention claimed is:

1. A method of scheduling and encoding data packets for transmission in a multicast session from a sender to a multicast group of receivers including at least two receivers in a multicast ARQ (Automatic Repeat reQuest) communication system for transfer of a given amount of multicast information, wherein the following steps are performed at each of a plurality of scheduling instances:
    obtaining feedback information from said at least two receivers indicating received data packets;
    forming at least one composite data packet as a weighted linear combination of regular data packets based on a corresponding weight vector comprising a set of coding weights;
    adapting, for each of said at least one composite data packet, said coding weights of said weight vector based on said feedback information such that the composite packet represents a linear combination of regular data packets that is linearly independent, for each receiver of those receivers of said multicast group that still need to receive one or more multicast data packets, of any data packet previously received by the receiver during said multicast session;
    said sender transmitting said at least one composite data packet to those receivers of said multicast group that still need to receive one or more multicast data packets,
    wherein said coding weights, at each of said plurality of scheduling instances, are adaptively selected such that, for each receiver of at least a set of said receivers, the weight vector will increase the rank of a receiver-specific matrix of weight vectors for previously received data packets if the weight vector is added to said matrix.

2. The method of claim 1, wherein said multicast session is defined for transfer of N regular data packets, and N linearly independent multicast data packets including said composite data packets are transferred to said multicast group of at least two receivers during said multicast session to ensure decodability of all N regular data packets.

3. The method of claim 1, wherein said coding weights, at a given scheduling instance, are adaptively selected such that the composite packet represents a linear combination of regular data packets linearly independent, for each receiver of at least a set of said receivers, of any regular data packet and composite data packet previously received correctly by the receiver during said multicast session.

4. The method of claim 3, wherein the feedback information indicating received data packets is based on at least one of a received regular data packet and a received composite data packet.

5. The method of claim 4, wherein the feedback information is based on a history of received data packets during said multicast session.

6. The method of claim 1, wherein said step of forming at least one composite data packet as a weighted linear combination of regular data packets based on a weight vector comprising a set of coding weights comprises the step of multiplying the regular packets by the corresponding coding weights.

7. The method of claim 6, wherein regular packets are divided into substrings and said step of forming at least one composite data packet as a weighted linear combination of regular data packets is performed on substring level.

8. The method of claim 1, wherein said composite data packet is formed from the payload portion of regular packets.

9. The method of claim 1, wherein each receiver-specific matrix of weight vectors for previously received data packets comprises coding weights, each coding weight $w_{m_k,n}^{(k)}$ is an individual weight factor associated with regular data packet n for the $m_k$:th multicast data packet received by receiver k, wherein the $m_k$:th multicast data packet is a regular data packet, or a composite data packet formed of at least two regular data packets.

10. The method of claim 1, wherein said coding weights of the weight vector are adaptively selected by testing, at each of said plurality of scheduling instances, tentative weight vectors until a weight vector of coding weights that increases the rank of said matrix of weight vectors is found.

11. The method of claim 1, wherein said coding weights of the weight vector $\omega$ are adaptively selected, at each of said plurality of scheduling instances, by first for receiver k calculating the nullspace $\Xi_k$ in rational form of respective receiver-specific matrix, and then selecting any desired vector $\xi_k$ lying in the null space $\Xi_k$, for which $\omega$ are adaptively selected such that $\xi_k \cdot \omega \neq 0$ $\forall k$, where "·" is the scalar product.

12. The method of claim 1, wherein said coding weights of the weight vector are adaptively selected such that the receiver-specific matrices of weight vectors will be sparse to reduce the number of encoding and decoding operations.

13. The method of claim 1, wherein the coding weights of a composite data packet at a first scheduling instance are adapted such that the composite packet represents a linear combination that is linearly independent, for each receiver of a first set of said receivers, of any data packet previously received by the receiver during said multicast session, and the coding weights of another composite data packet at a second later scheduling instance are adapted such that the composite packet represents a linear combination that is linearly independent, for each receiver of a second smaller set of said receivers, of any data packet previously received by the receiver during said multicast session.

14. The method of claim 1, wherein said at least two receivers comprises more than two receivers, and the weight vector of at least one composite data packet has at least two different non-zero coding weights.

15. The method of claim 1, wherein said step of forming at least one composite data packet comprises the step of forming multiple composite data packets based on the same feedback information, said multiple composite data packets being dependent of each other.

16. The method of claim 1, wherein said adapting step, at a given scheduling instance, comprises the step of adaptively selecting said coding weights of said weight vector such that the composite packet represents a linear combination of regular data packets that is linearly independent of any data packet previously received by each receiver in a set of receivers that still need to receive at least one multicast data packet during said multicast session.

17. An arrangement for scheduling and encoding data packets for transmission in a multicast session from a sender to a multicast group of receivers including at least two receivers in a multicast ARQ (Automatic Repeat reQuest) communication system for transfer of a given amount of multicast information, wherein said arrangement is configured for executing the following operational procedure at each of a plurality of instances:
  obtaining feedback information from said at least two receivers indicating received data packets;
  forming at least one composite data packet as a weighted linear combination of regular data packets based on a corresponding weight vector comprising a set of coding weights;
  adapting, for each of said at least one composite data packet, said coding weights of said weight vector based on said feedback information such that the composite packet represents a linear combination of regular data packets that is linearly independent, for each receiver of those receivers of said multicast group that still need to receive one or more multicast data packets, of any data packet previously received by the receiver during said multicast session;
  transmitting said at least one composite data packet to those receivers of said multicast group that still need to receive one or more multicast data packets,
  wherein said arrangement is operable for adaptively selecting, at each of said plurality of scheduling instances, said coding weights such that, for each receiver of at least a set of said receivers, the weight vector will increase the rank of a receiver-specific matrix of weight vectors for previously received data packets if the weight vector is added to said matrix.

18. The arrangement of claim 17, wherein said multicast session is defined for transfer of N regular data packets, and said arrangement is operable for transmitting N linearly independent multicast data packets including said composite data packets to said multicast group of at least two receivers during said multicast session to ensure decodability of all N regular data packets.

19. The arrangement of claim 17, wherein said arrangement is operable for adaptively selecting, at a given scheduling instance, coding weights such that the composite packet represents a linear combination of regular data packets that is linearly independent, for each receiver of at least a set of said receivers, of any composite data packet and possibly regular data packet previously received by the receiver during said multicast session, and the feedback information indicating received data packets is based on at least a received composite data packet and possibly a received regular data packet.

20. The arrangement of claim 17, wherein said arrangement is operable for forming said at least one composite data packet as a weighted linear combination of regular data packets by multiplying the regular packets by corresponding coding weights.

21. The arrangement of claim 17, wherein said arrangement is operable for forming said at least one composite data packet by dividing regular packets into substrings and forming said weighted linear combination of regular data packets on substring level.

22. The arrangement of claim 17, wherein said arrangement is operable for forming said at least one composite data packet from the payload portion of regular packets.

23. The arrangement of claim 17, wherein said arrangement is operable for testing, at each of said plurality of scheduling instances, tentative weight vectors until a weight vector of coding weights that increases the rank of said matrix of weight vectors is found.

24. The arrangement of claim 17, wherein said arrangement is operable for adaptively selecting, at each of said plurality of scheduling instances, said coding weights of the weight vector $\omega$ by first for receiver k calculating the nullspace $\Xi_k$ in rational form of respective receiver-specific matrix, and then selecting any desired vector $\xi_k$ lying in the nullspace $\Xi_k$, for which $\omega$ are adaptively selected such that $\xi_k \cdot \omega \neq 0$ $\forall k$, where "·" is the scalar product.

25. The arrangement of claim 17, wherein said sender represents a sending node and said receivers represent receiving nodes.

26. The arrangement of claim 17, wherein said arrangement is implemented in said sender.

27. The arrangement of claim 26, wherein said sender represents a sending node comprising a multicast scheduling module for adapting said coding weights and a composite data packet encoding module for forming said at least one composite data packet.

28. The arrangement of claim 27, wherein said multicast scheduling module is effectively operable for determining which regular data packets to use in said at least one composite data packet.

29. A sender for use in a multicast ARQ (Automatic Repeat reQuest) communication system, wherein said sender comprises an arrangement according to claim 17.

* * * * *

UNITED STATES PATENT AND TRADEMARK OFFICE
CERTIFICATE OF CORRECTION

PATENT NO. : 8,250,426 B2  Page 1 of 1
APPLICATION NO. : 12/515924
DATED : August 21, 2012
INVENTOR(S) : Larsson It is certified that error appears in the above-identified patent and that said Letters Patent is hereby corrected as shown below:

In Column 13, Line 50, delete "to ω" and insert -- ω --, therefor.

Signed and Sealed this
Twelfth Day of February, 2013

Teresa Stanek Rea
*Acting Director of the United States Patent and Trademark Office*